United States Patent
Prosl

(10) Patent No.: US 6,254,467 B1
(45) Date of Patent: Jul. 3, 2001

(54) DEVICE FOR DEBURRING WORKPIECES, IN PARTICULAR MOULDED PARTS AND CASTINGS MADE OF PLASTICS, RUBBER OR THE LIKE

(76) Inventor: Johanna Prosl, Freihunger Strasse 10, D-92708 Mantel (DE)

( * ) Notice: Subject to any disclaimer, the term of this patent is extended or adjusted under 35 U.S.C. 154(b) by 0 days.

(21) Appl. No.: 09/147,781
(22) PCT Filed: Sep. 3, 1997
(86) PCT No.: PCT/DE97/01928
  § 371 Date: Mar. 5, 1999
  § 102(e) Date: Mar. 5, 1999
(87) PCT Pub. No.: WO98/09787
  PCT Pub. Date: Mar. 12, 1998

(30) Foreign Application Priority Data

Sep. 7, 1996 (DE) .......................................... 296 15 629 U

(51) Int. Cl.[7] ...................................................... B24B 9/20
(52) U.S. Cl. ........................... 451/465; 451/485; 451/506
(58) Field of Search ..................................... 451/463, 464, 451/465, 485, 484, 506, 504; 29/81.01, 81.02, 81.021, 81.12, 81.13, 81.1; 15/104.09, 104.095

(56) References Cited

U.S. PATENT DOCUMENTS 573,734 * 12/1896 Webster ................................ 451/506
2,938,309 * 5/1960 Pollet .................................... 451/506
3,076,254   2/1963 Ricci .
5,297,905   3/1994 Schmidt et al. .

FOREIGN PATENT DOCUMENTS 43 10 831 A1   4/1993 (DE) .
44 45 592 A1  12/1994 (DE) .
   741317 *  2/1933 (FR) ................................... 451/465
  1426813    3/1987 (GR) .

* cited by examiner

Primary Examiner—Robert A. Rose
(74) Attorney, Agent, or Firm—Hoffman, Wasson & Gitler

(57) ABSTRACT

The invention concerns a device for deburring workpieces, in particular moulded parts and castings made of plastics, rubber or the like, said device comprising a rotatable shank (1) and linear tool elements (5, 6) which, in the axial direction, extend coaxially to the shank axis, are secured relative to the shank (1) and, as the latter rotates, can bulge out radially under the effect of centrifugal force. The device is designed such that an upper and a lower carrier (2, 3) are secured on the shank (1). The tool elements (5, 6) consist of individual threads or thread bundles whose ends are secured in the upper and lower carriers, a spring arrangement (7) being disposed concentrically with the shank (1) between the upper and lower carriers (2, 3).

10 Claims, 2 Drawing Sheets

DEVICE FOR DEBURRING WORKPIECES, IN PARTICULAR MOULDED PARTS AND CASTINGS MADE OF PLASTICS, RUBBER OR THE LIKE

This invention refers to a device for deburring workpieces, in particular moulded parts and castings made of plastics, rubber or the like, said device comprising a rotatable shank and linear tool elements which, in the axial direction, extend coaxially to the shank axis, are secured relative to the shank, and as the latter rotates, can bulge out radially under the effect of centrifugal forces.

Deburring devices with rigid cutting edges are known by means of which the burrs can be removed from moulded parts. Such tools are pressed against the workpiece to be processed with an adjustable force. In practice the problem arises that the burrs can only partly be removed or that while deburring it happens that not only the burr itself is removed, but that the tool also cuts into the surface of the workpiece.

Moreover, rotating tools formed as deburring brushes are known the bristles of which are made from metal and are clamped in such a manner that in operation their shape will not or practically not change. When deburring parts made of plastics or rubber, there is the danger that the surface of the workpiece also is subject to damage because the material the workpiece is made of is by far softer than that of the worktool so that the worktool when acting upon the surface of the workpiece will remove material from the workpiece.

Furthermore, from DE 44 45 592 A1 rotating tools are known which use a continuous rope of metal threads the ends of which are connected with each other, and which in a peripheral direction or alternatively concentrically to the rotational axis of the tool is provided with a plurality of coaxial sections which form the outer periphery of the tool. The rotating metal portion is twisted around a support, and the individual sections of the wire rope are fastened to the supports in such a manner that they are flexible in radial direction so that in view of the centrifugal force they bend or bulge outwardly when being rotated and exert an elastic pressure against the surface of the tool. This type of tool causes problems in practice because when treating complicated contours the metal rope dependent on the type of material and shape of the tool attacks and damages the surface of the workpiece because the life of the tools in view of the friction of the rope against the supports and the guide rollers for the rope are extremeley short so that the metal rope is to be exchanged rather often and accordingly an automatic operation procedure is to be interrupted, and because in view of the necessity for lubricating the support the lubricating particles carried along by the rope are intolerable on the workpiece and are to be avoided.

It is an object of this invention to provide a rotating device according to the introductory part of claim 1 in such a manner that the tool is able to handle also complicated shapes of contours and burrs on the surfaces of workpieces without any problems, that the tool is of simple structure and that it has a long life.

According to this invention this object is solved by a device which is designed such that an upper and a lower carrier are secured on the shank, that the tool elements consist of individual threads or bundles of threads, the ends of which are fastened with the upper and lower carriers, and that a spring arrangement is provided concentrically with the shank between the upper and the lower carriers. Such device can be operated in connection with a motor driven manual device, f.e. a drilling machine, however, it can also be attached to a roboter head, which in a programmable manner automatically deburs the workpiece to be processed.

The tool elements comprising individual threads, cords or the like, or bundles thereof, preferably are filaments which are fastened individually or in bundles at the upper and at the lower support. Preferably the ends of the threads resp. filaments are clamped to the supports. With a preferred embodiment of the invention the ends of the threads resp. filaments are clamped between the support body and a lid-type closure overlapping the support so that by putting the lid on under pressure the entirety of the ends of the threads or filaments will be fastened.

With a revised embodiment of the invention the upper and the lower supports on their peripheral surface are provided with extensions directed radially outwardly, which extensions are formed in such a manner that they receive the threads or thread bundles. Said extensions can be screw bolts screwed into the peripheral surface of the supports end said screw bolts are provided with peripheral grooves, screw heads or the like on their outer end, which receive the threads or thread bundles. The threads can be continuously guided around the receiving grooves as endless threads or in loops, they can be thread rings tensioned between the upper and the lower support, or the like. In order to hold or clamp the threads or thread bundles within the supports of the carriers a lid-like closure each is put on top of the upper and the lower support so that the free rim of the lid is provided with elements being clamped by means of the pressure of the lid onto the support, and so that the threads cannot change their position at the supports during the process. Said elements for example are O-ring gaskets. Also with this embodiment a spring system is provided in order to bias the supports against each other.

With the device according to the invention the tool elements, namely threads and filaments, such as cords made from plastics or metal threads, can be exchanged in an extremely simple and useful manner, because the ends of the individual threads or filaments simply need to be clamped on and off, or are to be inserted as a unit together with the upper and lower supports and are fastened by means of the lid-type upper and lower closings. The length of the threads or filaments is chosen longer than the distance between the upper and the lower support so that the threads or filaments in their central area are curved outwardly, when rotated. The extent of curvature can be adjusted according to the requirements of the practical use and dependent on the requirements of the deburring operation in connection with the materials of the workpiece, or alternatively can be adjusted automatically by the rotation of the tool. This is obtained by inserting spring means, such as a coil spring between the upper and the lower support, which spring means is formed as a pressure spring determining in the inactive position a maximum distance between the upper and the lower support, however, when rotating the system in view of the centrifugal force the threads or filaments are urged outwardly in a radial direction so that the movable clamping means, for example at the lower support, tends to shorten the distance between the upper and the lower support and compresses the coil spring so that the extent of the curvature is dependent on the number of rotations per time unit.

The device according to the invention operates in a very simple and effective manner, is economical, allows an extremely smooth and careful machining of the workpiece, high life of the tool elements and an adaption to different deburring problems or alternatively to moulded parts made of plastics or rubber which are to be deburred. The said device is especially useful for automatic deburring processes at roboter stations. Tool and workpiece are adjustable relative to each other.

In the following the invention is described in combination with the drawings by two embodiments.

Figure 1:
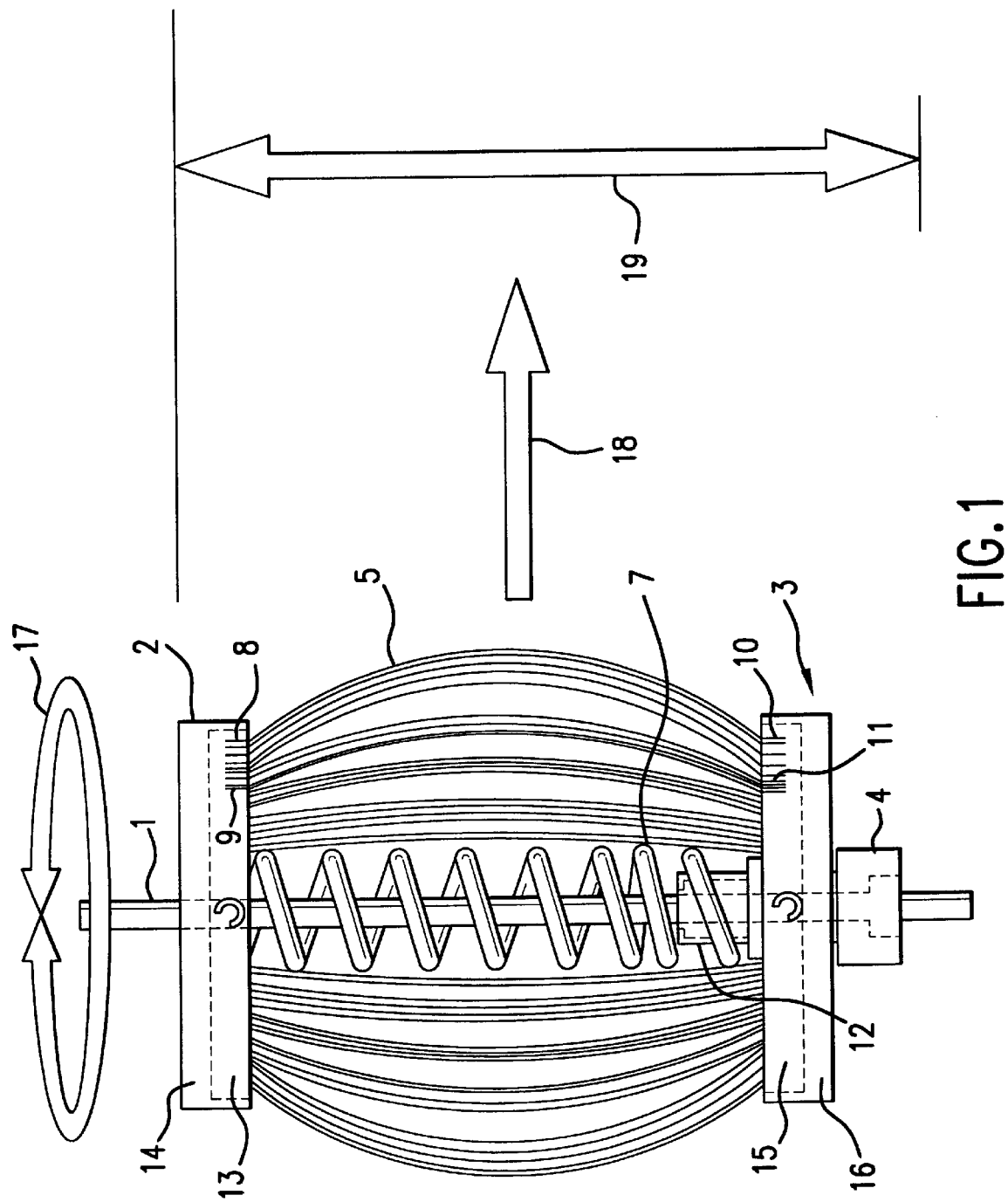
FIG. 1 shows a schematic lateral view of an embodiment of the invention.

A shank 1, which can be rotated by means of a spindle drive (not shown) is provided with an upper carrier 2 on its upper part, and a lower carrier 3 on its lower part. The lower carrier 3 is movable in height along shank 1 and is restricted downwardly by a counter nut. Between upper carrier 2 and lower carrier 3 tool elements 5, 6, such as threads, filaments, cords or the like are stretched. The distance between the two carriers 2 and 3 is determined by a coil spring 7 fastened on shank 1, which coil spring urges the lower carrier 3 downwardly. The threads, filaments 5, 6 or the like with their upper ends 8, 9 are attached to the upper carrier 2, the opposite ends 10, 11 either individually or in bundles are attached to the lower carrier 3. The filaments with their ends 8, 9 as well 10, 11 can be fastened to the outer periphery of the carrier body 13 and are clamped by putting the corresponding lids 14, 16 at top thereof. Spring 7 is set up onto the head 12 of the shank at the movable end and is fastened therewith. Head 12 is connected with the lower carrier 3 and both are guided together on shank 1. By changing the rotational speed of shaft 1 the centrifugal force exerted onto the tool elements 5, 6 is varied. Dependent thereon the movable lower carrier 3 is moved upwardly or downwardly on shank 1. This movement is counteracted by the spring force of spring 7.

17 indicates the rotational direction of the rotating shank 1, 18 is the radial movement of the tool elements 5, 6, and 19 is the axial movement of spring 7 as well the lower carrier 3 and accordingly the bulging of the tool elements 5, 6.

Figure 2:
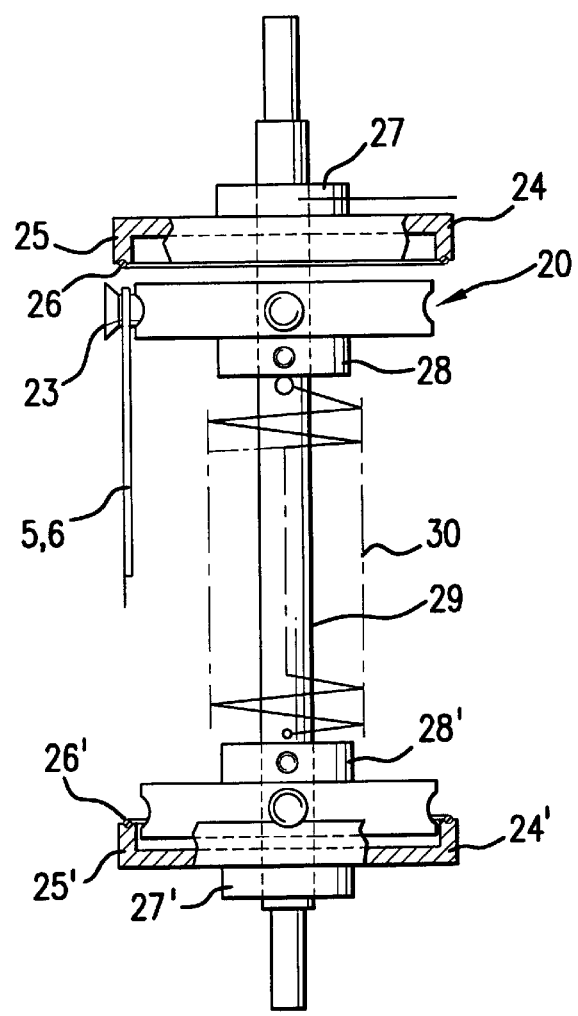
FIG. 2 is another embodiment of the invention in a lateral view.
Figure 3:
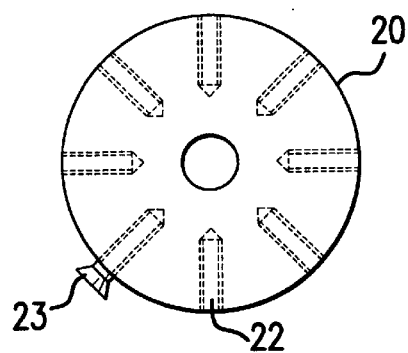
FIG. 3 is a plan view of the support according to FIG. 2.

The embodiments according to FIGS. 2 and 3 show an upper carrier 20 and a lower carrier 21 with a plurality each of projections 23, such as screw bolts, distant from each other in a peripheral direction and extending outwardly in a radial direction beyond the carrier 20 resp. 21 which screw bolts are screwed onto the corresponding carriers by means of shanks 22. Associated to the carriers 20, 21 is a closing lid 24, 24' each, the peripheral rim 25, 25' of which at its free end receives a gasket 26, 26', such as an O-ring, which exerts a pressure onto the threads 5, 6 guided within projections 23 by clamping means 27, 27'. Further clamping means 28, 28' are provided at opposite sides of the carriers 20, 21 on shank 29. Between the two clamping means 28, 28' a pressure spring 30 is provided, which under pressure pulls apart the carriers 20, 21 and keeps the threads 5, 6 tensioned. When rotating the device the centrifugal force causes the threads 5, 6 to bulge (as shown in FIG. 1), and accordingly results in a relative movement of the one carrier against the other, whereby at the same time the pressure spring 30 is compressed.

Threads 5, 6 can be positioned within grooves of the projections 23. They can pass continuously from an upper projection to a lower projection (individually or in bundles), then towards the next upper projection in peripheral direction and so forth, or merely between upper and lower associated projections each, or can be wound in any other scheme.

What is claimed is:

1. Device for deburring workpieces comprising a rotatable shank having a longitudinal axis, an upper and a lower carriage secured on the shank, linear tool elements consisting of filaments, the ends of the filaments being secured in the upper and the lower carrier, and a spring arrangement disposed concentrically with the shank between the upper and the lower carrier, characterized in that the filaments extend coaxially to the longitudinal axis of the shank and the filaments bulge out radially under the effect of centrifugal force as the shank rotates, wherein the extent of the bulging of the filaments is dependent on the number of rotations per time unit, wherein one of the upper and the lower carrier is provided with a counter nut which is adjustably connected with the shank, and which determines the maximum distance between the upper and the lower carrier.

2. Device according to claim 1, wherein the ends of the filaments are clamped at the carriers.

3. Device according to claim 2, wherein the carriers each comprise a carrier body and a lid-type end portion overlapping the carrier body, and the ends of the filaments are clamped between the carrier body and the lid-type end portion.

4. Device according to claim 1, wherein the upper and the lower carrier are provided with extensions directed radially outwardly to their peripheral surfaces and designed for receiving the ends of the filaments.

5. Device for deburring workpieces comprising a rotatable shank having a longitudinal axis, an upper and a lower carriage secured on the shank, linear tool elements consisting of filaments, the ends of the filaments being secured in the upper and the lower carrier, and a spring arrangement disposed concentrically with the shank between the upper and the lower carrier, characterized in that the filaments extend coaxially to the longitudinal axis of the shank and the filaments bulge out radially under the effect of centrifugal force as the shank rotates, wherein the extent of the bulging of the filaments is dependent on the number of rotations per time unit, wherein the upper and the lower carrier are provided with extensions which are directed radially outwardly to their peripheral surfaces and are designed for receiving the ends of the filaments, wherein the extensions are screw bolts screwed into bores of the peripheral surface of the carriers which screw bolts are provided with means for retaining the filaments.

6. Device for deburring workpieces comprising a rotatable shank having a longitudinal axis, an upper and a lower carriage secured on the shank, linear tool elements consisting of filaments, the ends of the filaments being secured in the upper and the lower carrier, and a spring arrangement disposed concentrically with the shank between the upper and the lower carrier, characterized in that the filaments extend coaxially to the longitudinal axis of the shank and the filaments bulge out radially under the effect of centrifugal force as the shank rotates, wherein the extent of the bulging of the filaments is dependent on the number of rotations per time unit, the upper and the lower carrier are provided with extensions which are directed radially outwardly to their peripheral surfaces and are designed for receiving the ends of the filaments, wherein the filaments are secured by grooves or screw heads.

7. Device according to claim 6, wherein at the lower and the upper area of the shank a lid-type cover is provided having a ring gasket at the free peripheral end arranged so that said gasket under pressure rests upon the filaments wound around the means, and fixes the filaments in operation.

8. Device according to claim 7, wherein the ring gasket is an O-ring gasket.

9. Device according to claim 8, wherein the upper and the lower lid-type covers are fastened by counter nuts, so that the O-rings are pressed against the filaments.

10. Device for deburring workpieces comprising a rotatable shank having a longitudinal axis, an upper and a lower carriage secured on the shank, linear tool elements consisting of filaments, the ends of the filaments being secured in the upper and the lower carrier, and a spring arrangement disposed concentrically with the shank between the upper and the lower carrier, characterized in that the filaments extend coaxially to the longitudinal axis of the shank and the filaments bulge out radially under the effect of centrifugal force as the shank rotates, wherein the extent of the bulging of the filaments is dependent on the number of rotations per time unit, the upper and the lower carrier are provided with extensions which are directed radially outwardly to their peripheral surfaces and are designed for receiving the ends of the filaments, wherein at least one of the carriers is attached movably in height on said shank, and is restricted by counter nuts and an adjusting screw outwardly on the shank.

* * * * *